United States Patent
Beazer et al.

(10) Patent No.: US 6,487,742 B1
(45) Date of Patent: Dec. 3, 2002

(54) SIDE PIVOT CAB FOR LOADING OR UNLOADING AN AIRPLANE

(75) Inventors: Eric P. Beazer, Ogden, UT (US); Gary R. Mitchell, Corinth, TX (US); Thomas I. Chase, Fruit Heights, UT (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/329,629

(22) Filed: Jun. 10, 1999

(51) Int. Cl.⁷ .................................................. E01D 1/00
(52) U.S. Cl. ........................... 14/71.5; 14/69.5; 14/71.1
(58) Field of Search ................................. 14/71.5, 72.5, 14/69.5, 71.1

(56) References Cited

U.S. PATENT DOCUMENTS

| | | | | |
|---|---|---|---|---|
| 3,060,471 A | * | 10/1962 | Der Yuen et al. | |
| 3,110,048 A | * | 11/1963 | Bolton | 14/71.5 |
| 3,315,291 A | * | 4/1967 | Wollard et al. | 14/71.5 |
| 3,404,417 A | | 10/1968 | Wollard et al. | |
| 3,412,412 A | * | 11/1968 | Kjerulf et al. | 14/71.5 |
| 3,538,529 A | * | 11/1970 | Breier | 14/71.5 |
| 3,581,331 A | * | 6/1971 | Fisher et al. | 14/7.5 |
| 3,606,626 A | * | 9/1971 | Eggert, Jr. | 14/71.5 |
| 3,683,440 A | * | 8/1972 | Xenakis et al. | 14/71 |
| 3,843,987 A | * | 10/1974 | Lodjic | 14/71.5 |
| 3,964,118 A | * | 6/1976 | Meyers et al. | |
| 4,110,859 A | * | 9/1978 | Lichti | 14/71.5 |
| 4,333,194 A | * | 6/1982 | Drozd | 14/71.5 |
| 4,490,869 A | * | 1/1985 | Morin | 14/71.5 |
| 5,761,757 A | * | 6/1998 | Mitchell et al. | 14/71.5 |

FOREIGN PATENT DOCUMENTS

EP          0 302 709 A      8/1989

* cited by examiner

*Primary Examiner*—Gary S. Hartmann
(74) *Attorney, Agent, or Firm*—Trask Britt, PC

(57) ABSTRACT

A side cab providing enclosed pedestrian entrance to, or egress from, an airplane access door. The side pivot cab facilitates engaging one end of an access passageway with an aircraft access door by aligning interface structure for engagement with the aircraft. A side pivot cab rotates about an axis near, or associated with, a wall of an access passageway from an airport terminal building. A single adjustable wall extends or contracts to accommodate rotation of a pivot cab. Rotation capability of a side pivot cab may approach 270 degrees.

13 Claims, 6 Drawing Sheets

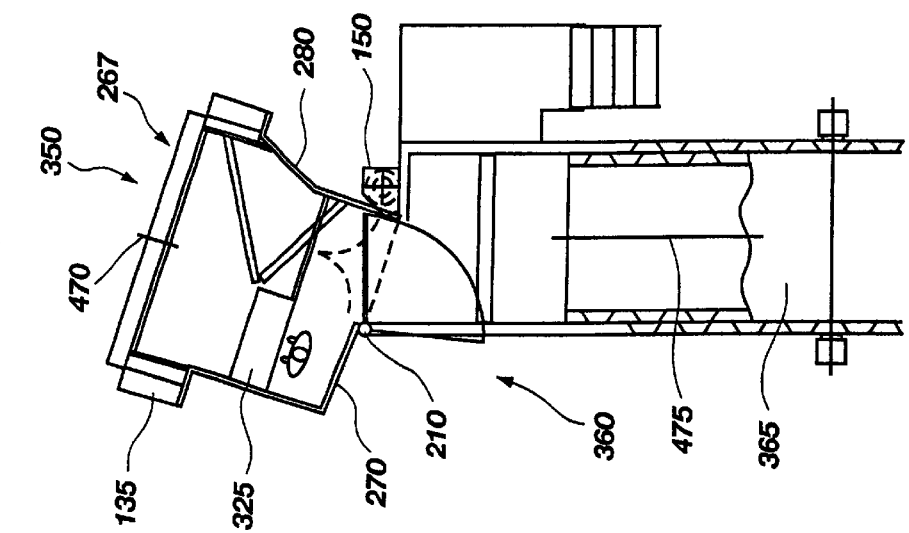
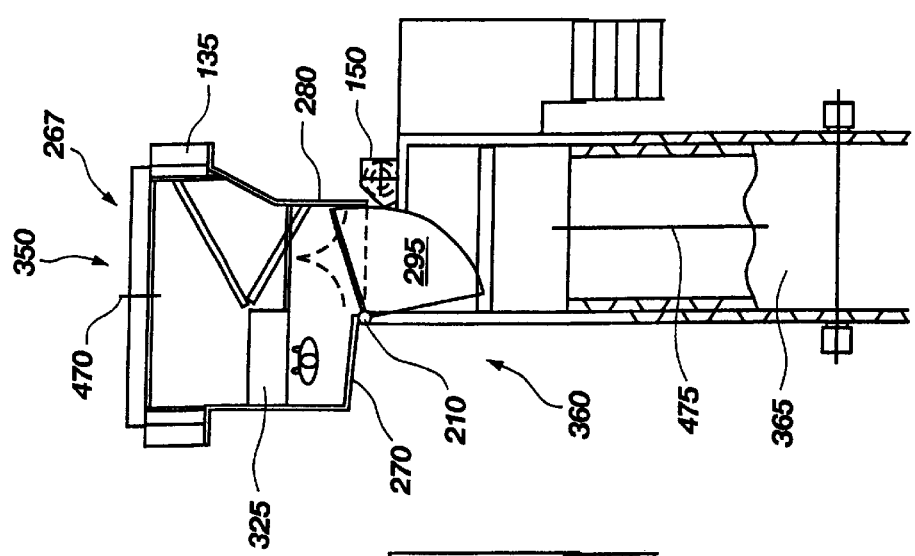
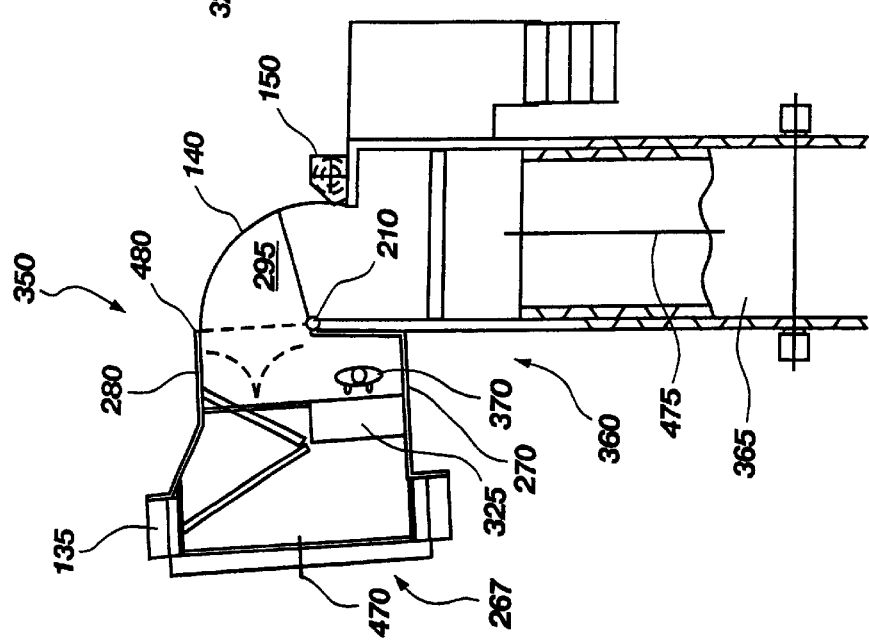
Fig. 5C
Fig. 5B
Fig. 5A

SIDE PIVOT CAB FOR LOADING OR UNLOADING AN AIRPLANE

TECHNICAL FIELD

This invention relates generally to vehicular loading and unloading structure. It particularly relates to devices providing pedestrian or cargo entrance to, or egress from, an aircraft. It is most particularly directed to mechanized hallways providing an enclosed pedestrian passageway access from a building, such as an airport terminal, to an airplane access door or port.

BACKGROUND

Passenger boarding bridges are typically provided to transfer passengers from a centrally located airport terminal to aircraft. An above ground floor of a modem terminal provides distributed gathering locations for passengers of different aircraft. Such gathering locations are typically constructed at approximately the elevation of an aircraft. Elevated passenger boarding passageways are provided from a terminal exit opening to an aircraft access door. Such passageways minimize the climbing or descending required for a passenger to board an aircraft.

The elevation of the passageway separates the boarding process from baggage loading and unloading, which occurs primarily at ground level. Passageways are generally enclosed to provide climate control and protection from inclement weather. Enclosures also increase safety by keeping pedestrians on the boarding ramp, and shielding pedestrians from moving aircraft structure.

Passenger boarding ramps generally have the capability to increase in length to span a variable distance from a terminal to a parked aircraft. A discharge end of such a boarding ramp may also be capable of transverse movement to increase the range of aircraft service positions. A pivot cab is generally provided at the discharge end of a boarding ramp to align structure for engagement of an aircraft to aircraft having variable alignment with the boarding ramp. Examples of extendable passageways having pivot cabs are disclosed in U.S. Pat. Nos.: 2,688,762; 2,700,169; 2,875,457; and 3,038,185.

Commercially available pivot cabs suffer certain inefficiencies. They provide a pivoting rotation of the cab about an axis located approximately on a centerline of the aircraft interface end of a passageway. This pivot location requires complicated and heavy assemblies for the construction of a pivot cab. One commercially available embodiment has rigid overlapping walls arranged in a circular configuration. Such a pivot cab has a range of allowable pivot angles limited by the length of overlapped walls, and relative sizes of exterior and interior openings. A typical total included pivot angle between a first and second extreme rotation afforded by a cab of this design might be 20 degrees.

A second commercially available pivot cab design has more rotation capability. In this design, an adjustable wall is provided on either side of an aircraft access opening. Rotation of such a pivot cab expands one wall while the other wall is simultaneously retracted. While affording increased rotation capability, such a pivot cab still suffers from heavy assemblies used in its construction. Also, the right exterior profile of the central pivot design presents obstructions which may interfere with propellers and spinners for commercial aircraft.

SUMMARY OF THE INVENTION

The present invention provides an apparatus for engaging one end of an access passageway with an aircraft access port. The invention may find application in: passenger boarding bridges, mobile aircraft service vehicles, aircraft service corridors, and mobile aircraft boarding lounges. The invention includes a pivot cab for association with an open end of a passageway. A pivot cab of this invention includes a pivot structure generally associated with a side-wall of the passageway. The pivot structure location, being out of registration with a center of the passageway, causes an unsymmetric rotation of the pivot cab about the passage opening. The passageway may be enclosed, or may simply include a sidewalk, bridge, or gangplank. A first end of a pivot cab is in open communication with the passageway. Structure of a pivot cab defines a volume bounded by a roof, a first panel, a floor, and an adjustable wall. In certain preferred embodiments, the volume enclosed by a pivot cab is also defined by a second panel. The first panel, preferably comprising a window to provide an operator a range of view, is rotatably secured to the pivot structure. Preferred embodiments will have an operator console cooperatively configured and arranged with the first panel to form an operator station being substantially to a side and out of the flow of traffic through the passageway. A second end of the pivot cab is in open communication with interface structure constructed and arranged to engage an aircraft. In general, a weather barrier comprising a doorway and a dividing panel will be provided to seal the passageway when an aircraft is not in engagement with the second end of the pivot cab. It is preferred for the dividing panel to comprise a window for improved operator field of view. A pivot cab according to principles of the present invention may have an included pivot angle capability of approximately 135 degrees between a first and a second rotation orientation. The maximum included angle of rotation for an embodiment of this invention approaches 270 degrees.

In practice at most modern airports, a total included pivot angle of 15 to 20 degrees is sufficient for an embodiment of a pivot cab. Particularly under such low articulation conditions, a configuration comprising one or more rigid panel elements may suffice as an adjustable wall. A suitable rigid panel configuration includes a plurality of overlapping adjacent panel members having a common curvature and disposed for transverse motion relative each other. The transverse motion would, of course, be in a direction to extend or retract the adjustable wall. An alternative adjustable wall may include a plurality of individual panels being interconnected and disposed to assume the shape of underlying support structure. Such an adjustable wall may be deployed from a rolled-up storage configuration. An adjustable wall may also include a curtain manufactured from a suitable fabric or other material. In certain embodiments include curtain walls, the adjustable wall may be stored in a rolled-up configuration within a housing. In other embodiments, the adjustable wall may be stored within, or adjacent, a storage wall panel by a relatively linear retraction, similar to either a hand-held fan or a pocket door. Such a storage wall panel may include structure associated with either a passageway side-wall or a pivot cab enclosing panel.

BRIEF DESCRIPTION OF THE FIGURES

In the drawings, which illustrate what is currently regarded as the best modes for carrying out the invention and in which like reference numerals refer to like parts in different views or embodiments:

FIGS. 5A–C illustrate plan views in partial cross-section of a third embodiment of a pivoting cab in a plurality of rotation orientations;

BEST MODES OF THE INVENTION

Figure 1:
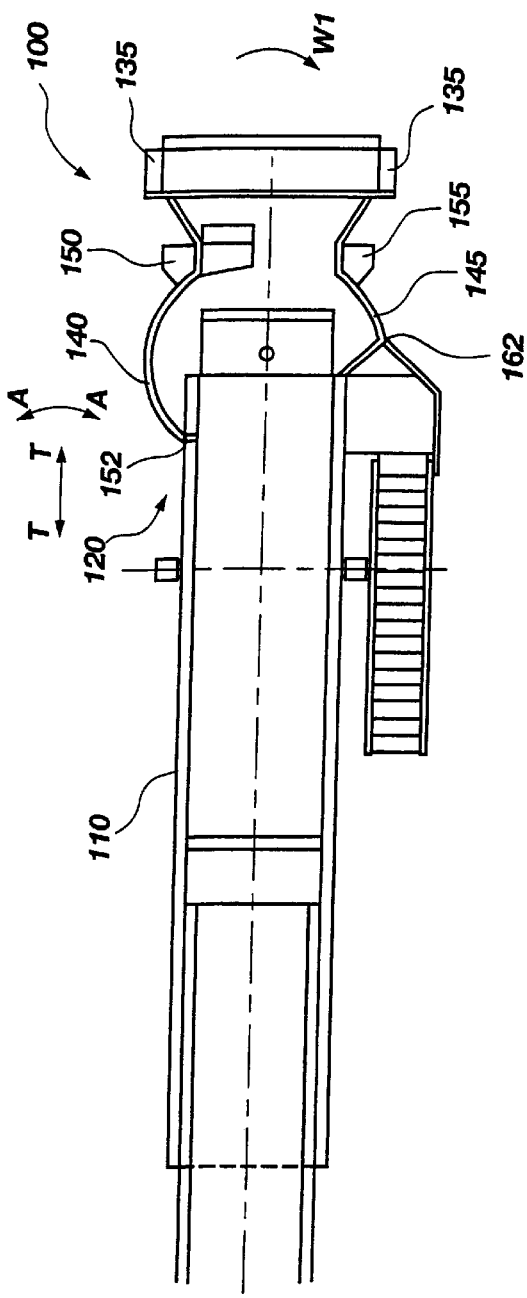
FIG. 1 is a plan view in partial cross-section of a prior art embodiment of a pivoting cab for registration of one end of an access passage with an aircraft access opening.

A prior art embodiment of a pivot cab 100 to register one end of an access passageway 110 with an aircraft access port of an aircraft (not illustrated) is shown in FIG. 1. Illustrated access passageway 110 includes moveable, extendable access structure typically associated with an airport terminal building to provide passenger access to an aircraft. A first end of passageway 110 generally will have the capability to translate in and out as indicated by arrow T—T, and may also move in an arcuate path in a transverse direction, as indicated by arrow A—A.

Prior art cab 100 is constructed to rotate about a central location, designated by 130, to orient aircraft interface canopy 135 for registration with an aircraft. During such rotation in a direction indicated by W1, a first adjustable cab wall 140 will necessarily be extended, and a second adjustable cab wall 145 will be retracted by an approximately equivalent amount. The first adjustable cab wall 140 typically includes multipanel or other structure capable of being rolled up and stored inside a housing, such as housing 150. Housing 150 may be constructed to provide automatic rolling and unrolling of adjustable wall 140 as required to extend and retract the wall 140 due to rotation of cab 100 about central location 130. Adjustable cab wall 140 therefore has a variable exposed length dependent upon rotation orientation of cab 100. In all orientations, cab wall 140 spans the arcuate distance between attachment structure 152 associated with end 120 of access tunnel 110 and structure associated with housing 150. The second adjustable cab wall 145 generally has a construction similar to adjustable wall 140 and could be regarded as essentially a mirror image counterpart, except perhaps having a different variable exposed length comprising the arcuate distance between structure associated with housing 155 and attachment structure 162 associated with end 120 of access tunnel 110.

Figure 2:
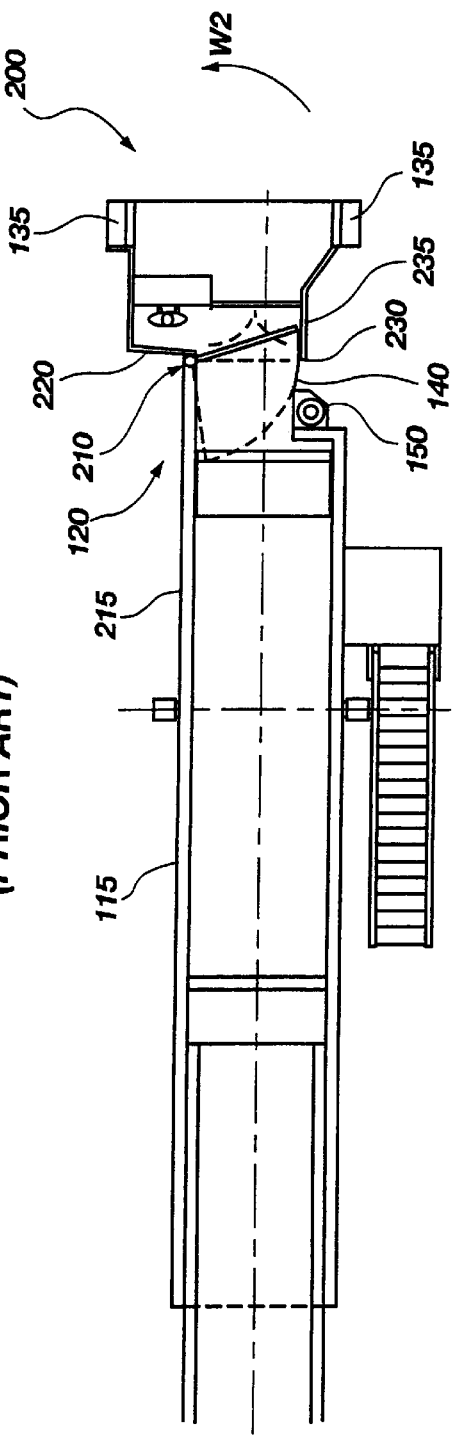
FIG. 2 is a plan view in partial cross-section of an embodiment of a pivoting cab for registration of one end of an access passage with an aircraft access opening according to principles of the present invention.

FIG. 2 illustrates one embodiment comprising a pivot cab 200 constructed according to principles of the present invention to register one end of a second access passageway 115 with an aircraft access port. Pivot cab embodiment 200 is constructed to rotate about an approximately vertical axis passing through pivot structure 210 generally associated with passageway side-wall 215 at first end 120 of access passageway 115. It should be noted that passageway 115 may be enclosed, or may comprise an elevated sidewalk, or gangplank. Preferred embodiments of passageways are enclosed for climate control and weather protection.

Pivot structure 210 may be located on either a left or right side of access passageway 115. Location of the pivot structure is dependent on desired pivot cab rotation angles and the orientation and arrangement of the access passageway. A first cab enclosing panel 220 is rotatably secured by way of appropriate structure to pivot element 210. Rotation of pivot cab 200 about pivot element 210, in a direction W2, causes adjustable cab wall 140 to extend. Adjustable wall 140, as illustrated, may also be designated as a curtain wall. In all rotation orientations, cab wall 140 spans the arcuate distance between attachment structure 230 associated with a second cab enclosure panel 235 and structure associated with housing 150. Reversing the direction of rotation causes the opposite effect on adjustable cab wall 140; wherein adjustable wall 140 retracts and the retracted portion is stored inside housing 150.

As can now be readily seen, the improved pivot location of this embodiment, associated with a side-wall of an access passageway, beneficially allows elimination of one adjustable cab wall compared to the prior constructions. Location of the pivot structure on, or near, a side-wall allows many reductions in the cost and size of the support structure without reducing the potential aircraft service positions and passageway to aircraft centerline angles. A side pivot cab also improves internal traffic flow by eliminating abrupt changes in direction. An additional improvement afforded by a side pivot cab is a cleaner exterior profile. The profile of a side pivot cab removes obstructions from the right exterior of a passageway to allow clearance for propeller and spinner of commercial passenger aircraft.

Figure 3:
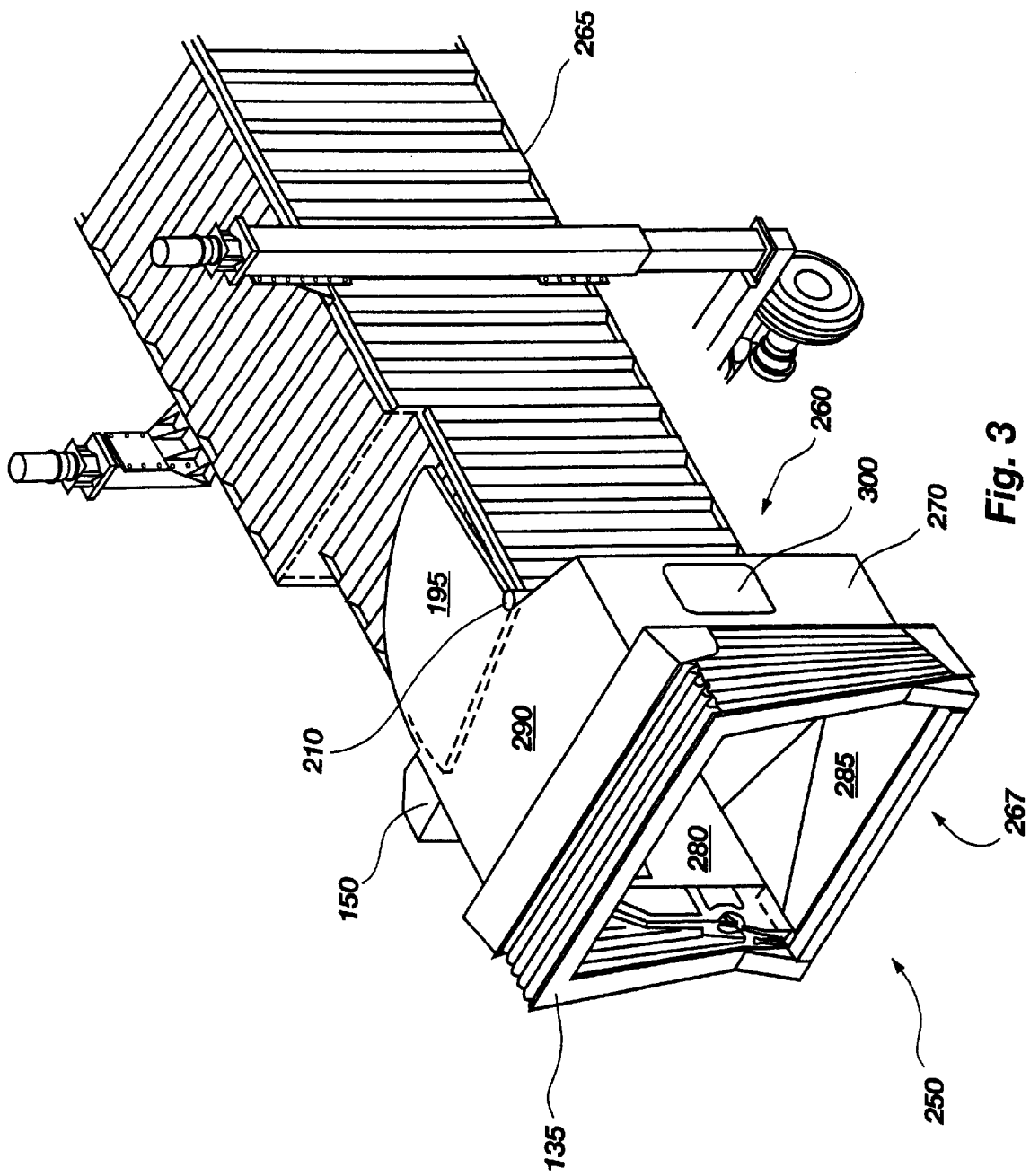
FIG. 3 is an illustration in perspective of an access passageway having an embodiment of a pivoting cab according to principles of the present invention, wherein the cab is rotated to a first orientation for substantially straight-on registration of the passageway with an aircraft access opening.

An illustration in perspective of a second embodiment of a pivot cab 250 according to the present invention is shown in FIG. 3. Pivot cab 250 is adapted to be carried on a first end 260 of a third embodiment of a passageway 265. As illustrated, pivot cab 250 is rotated to a first orientation for substantially straight-on registration of the passageway 265 with an aircraft access opening 267 through aircraft interface bumper 135. Pivot cab 250 comprises a volume in open communication at a first end with access passageway 265, the volume includes: first cab enclosing panel 270, second cab enclosing panel 280, cab enclosing floor 285, and cab enclosing roof 290. Pivot cab 250 is also in open communication at a second end with aircraft access opening 267. As adjustable cab wall 140 extends, the extended portion is carried by wall supporting structure associated with cab enclosing floor 285 and cab enclosing roof 290. Adjustable wall 140 conforms to and assumes the underlying arcuate shape defined by such wall supporting structure. Therefore adjustable wall 140 may include both straight and curved segments, depending on the configuration and arrangement of the wall supporting structure (not illustrated).

While a preferred cab enclosing floor 285 is illustrated as including a plurality of conjoined plane surfaces, other configurations are also workable. A first end of cab enclosing roof 290 also may carry a weather resistant appendage 295, as illustrated, to sealingly interface with structure associated with first end 260 of access passageway 265. Other configurations, including without limitation, telescopic or overlapping panels, expandable sections, and roll-up members, are also within contemplation to provide an equivalent weather resistant appendage.

First cab enclosing panel 270 may include a plurality of interconnected plane panel sections, as illustrated, or may include sections having non-planar configurations, or even a single substantially planar section. A first end of first cab enclosing panel 270 carries structure for rotatable attachment to pivot element 210, and a second end of enclosing panel 270 carries structure to fixedly attach aircraft interface bumper 135. A first window 300 is preferably provided in first enclosing panel 270, as illustrated, to increase a range of visibility for an operator. First window 300 may comprise one or more separate window elements in enclosing panel 270.

Figure 4:
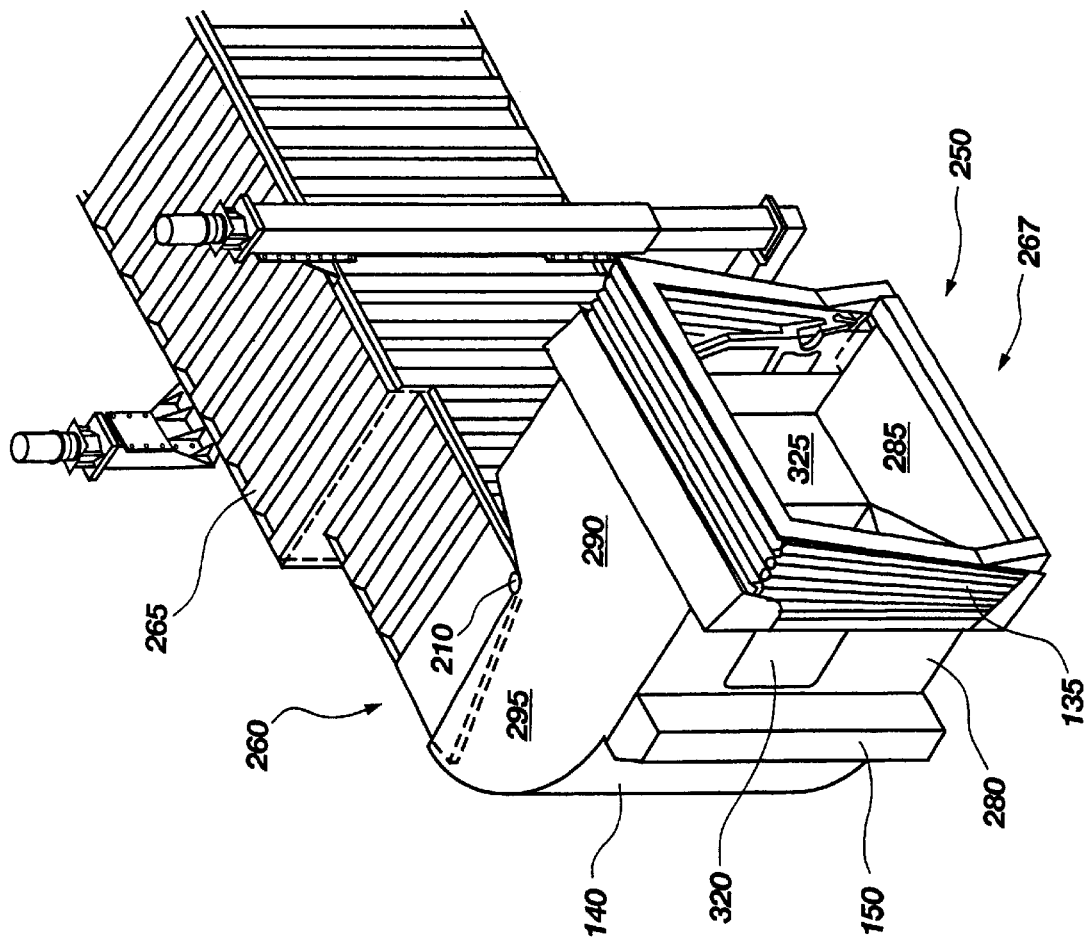
FIG. 4 is an illustration in perspective of the embodiment of FIG. 3, wherein the cab is rotated to a second orientation for angled registration of the passageway with an aircraft access opening.

FIG. 4 depicts the embodiment of pivot cab 250 of FIG. 3, but rotated counterclockwise, as seen from above, to a second orientation for angled registration of the passageway 265 with an aircraft access opening 267. In this orientation, additional elements bounding the volume formed by a pivot cab may now be seen. In this illustration, it may be seen that a pivot cab volume is further bounded by adjustable cab wall 140. As will be seen presently, housing 150 may be configured for attachment to second cab enclosing panel 280 (illustrated), or alternatively, to structure associated with a first end 260 of passageway 265. In the illustration, cab enclosing panel 280 includes a single plane surface, however, a plurality of interconnected panels having plane or other surface shapes are also workable. A second window 320 may be provided in second enclosing panel 280 to increase a range of visibility for an operator. Visible in FIG. 4 through an opening in aircraft interface bumper 135 is an operator console 325.

FIGS. 5A–C illustrate plan views in partial cross-section of a third embodiment of a pivot cab 350 oriented at a plurality of angles with an aircraft access opening 267. Pivot cab 350 is carried by a first end 360 of fourth access passageway 365. Of course, the aircraft access opening 267 may be oriented as required for engagement with an aircraft access port of an aircraft. The cab enclosing panels 270 and 280 of the illustrated embodiment of pivot cab 350 both include a plurality of conjoined plane sections. The pivot cab 350 is illustrated in a maximum left rotated position in FIG. 5A, in a substantially straight-on position in FIG. 5B, and in a maximum right rotated position in FIG. 5C. A rotation angle for a pivot cab structure is defined as the angle measured between a line 470 illustrated generally perpendicular to aircraft access opening 267, and a line 475 illustrated generally parallel to a centerline of a first end of a passageway. The maximum left rotation angle illustrated in FIG. 5A is approximately 100 degrees. FIG. 5B illustrates an approximately zero rotation angle, and FIG. 5C illustrates an approximately 35 degrees right rotation angle. In this embodiment, a total included pivot angle of approximately 135 degrees may be accomplished between maximum right and left orientations. For purpose of illustration in FIGS. 5A–C, an operator 370 is shown standing behind operator console 325.

Pivot cab 350 includes a housing 150 attached to structure associated with a first end 360 of passageway 365. Rotation of pivot cab 350 to a position as illustrated in FIG. 5A causes an extension of adjustable wall 140 sufficient to span the arcuate distance from housing 150 to attachment structure 480 associated with cab enclosing panel 280. Rotating pivot cab from a position as illustrated in FIGS. 5A to 5C causes an retraction of adjustable wall 140, with the retracted wall portion being stored within housing 150. An exposed portion of adjustable wall 140 is sufficient to span the arcuate distance from housing 150 to attachment structure 480. In a maximum right rotated position, illustrated in FIG. 5C, the entire adjustable wall may be retracted and stored within housing 150.

Figures 6A, 6B, 6C:
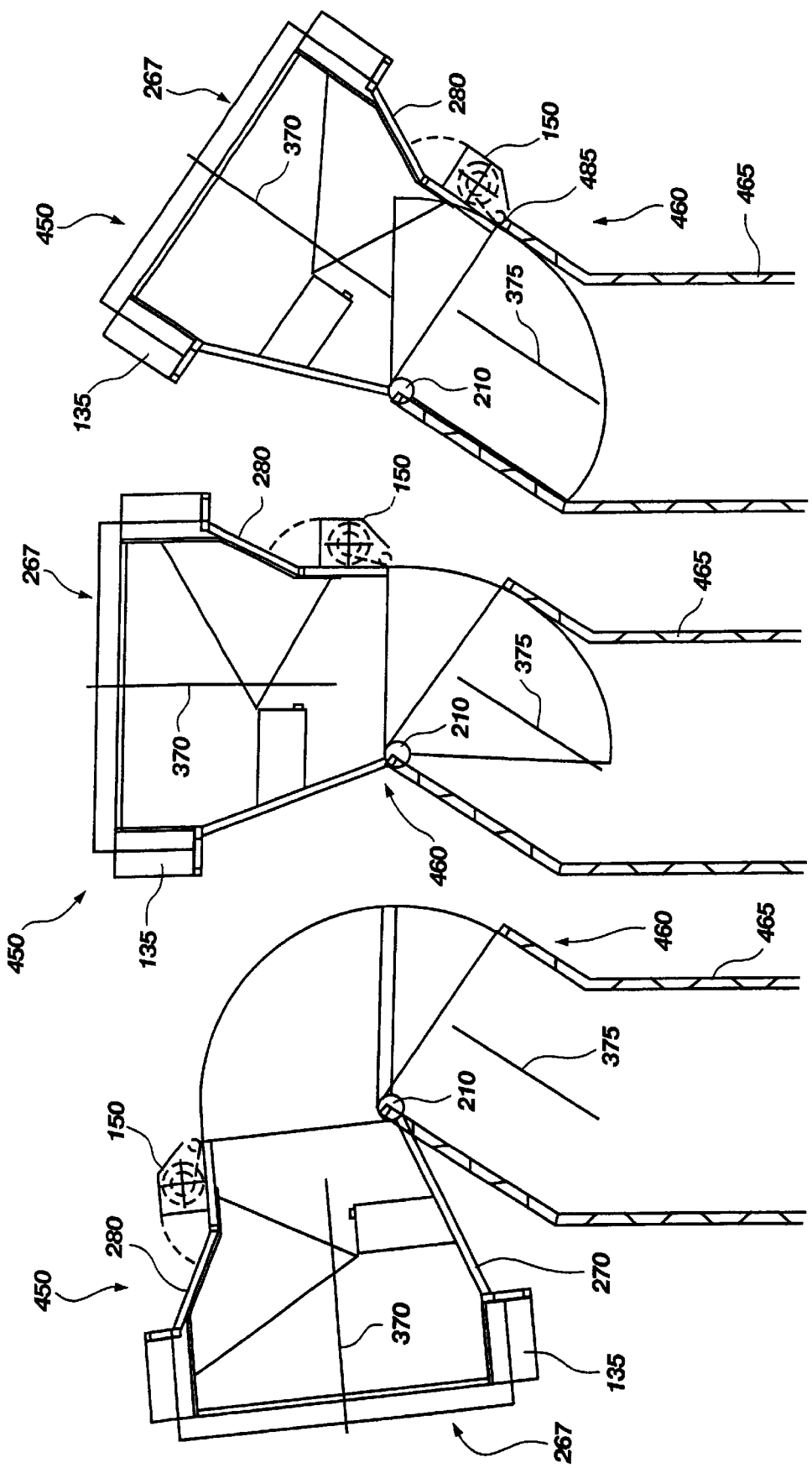
FIGS. 6A–C illustrate plan views in partial cross-section of a fourth embodiment of a pivoting cab in a plurality of rotation orientations.

FIGS. 6A–C illustrate plan views in partial cross-section of a fourth embodiment of a pivot cab 450 carried by a first end 460 of fifth embodiment of an access passageway 465 for registration of the access passageway at a plurality of angles with an aircraft access opening 267. The pivot cab 450 is illustrated in a maximum left rotated position in FIG. 6A, in an intermediate position in FIG. 6B, and in a maximum right rotated position in FIG. 6C. As with the embodiment of FIGS. 5A–C, a total rotation of approximately 135 degrees may be accomplished between maximum right and left orientations illustrated in FIGS. 6A and C. FIG. 6A illustrates a pivot cab left rotation angle in excess of 140 degrees. Comparing the embodiments of FIGS. 5A and 6A demonstrates the effect of structural arrangement of cab enclosing panel 270 on the maximum left rotation angle. The illustrated cab enclosing panel 270 of embodiment 450 comprises a single plane surface, allowing additional rotation compared to embodiment 350. A maximum cab left rotation angle approaching 180 degrees is certainly within contemplation for an alternate embodiment of a pivot cab.

A right rotation of a pivot cab embodiment is effectively limited by dimensions and structure of enclosing panel 280. Rotation capability terminates when adjustable wall 140 is fully retracted in housing 150. In FIG. 6C, maximum rotation is accomplished when structure associated with panel 280 and housing 150 meets structure 485 associated with a first end 460 of passageway 465. Reference lines 370 and 375 are not quite parallel as illustrated. However, in the event that panel 280 included a shorter overall length than illustrated, an additional rotation could be accomplished before structure associated with panel 280 and housing 150 met structure 485. The limiting minimum length for enclosing panel 280 might be merely sufficient to attach structure associated with housing 150. Alternatively, if housing 150 were attached to passageway 465, enclosing panel 280 might simply include attachment structure to secure one end of adjustable wall 140. Conceivably, adjustable wall 140 could attach to structure associated with aircraft interface bumper 135 in certain embodiments of pivot cabs. A total included pivot angle capability between maximum right and left positions might approach 270 degrees.

In FIGS. 3 and 4 it is seen that aircraft interface bumper 135 may be configured as an expanding bellows arrangement, whereby to provide a measure of protection, interior the pivot cab, from adverse weather when the cab is in registration with an aircraft. Making reference now to FIG. 7, additional details providing weather resistance interior a pivot cab embodiment may be demonstrated. A weather doorway 480 may be included in a pivot cab to provide a weather resistant barrier. Doorway 480 is configured and arranged to sealingly span from floor 285 to roof 290, and from enclosing wall 280 to a location in the interior of pivot cab 250. Sealing, for purposes of a pivot cab, does not mean water or air tight, but rather that a measure of resistance to flow through a cross-section is accomplished. The illustrated doorway embodiment 480 has a left door 485, and a right door 490 which in combination may be arranged to sealingly obstruct the doorway 480. Of course a single door would also provide the desired weather resistant barrier. Left and right doors 485 and 490 may be structured and arranged to swing in an outward direction (illustrated), an inward direction, or both. Dividing panel 495 sealingly fills the opening between doorway 480 and enclosing wall 270. Dividing panel 495 preferably comprises a transparent material, or has one or more windows to provide a range of visibility to an operator. An operator, standing in operator station area 500, may therefore be protected from adverse weather by dividing panel and doorway 480 when an aircraft is not in registration with receiving structure 135 of the pivot cab. Dividing panel 495 and doorway 480 provide a barrier to close off one end of a passageway. Closing the end of a passageway prevents excessive loss of climate controlled air, thereby helping to minimize heating or cooling costs.

The arrangement of elements, such as the control console 235, interior the pivot cab may be such as to streamline the flow of traffic through the cab. The illustrated operator console is cooperatively configured and arranged with enclosing panel 270 to form an operator station being substantially to a side and out of the flow of traffic through an access passageway. An operator standing in operator station area 500 is out of the flow of pedestrian traffic, thereby decreasing congestion. The volume of operator station 500, as illustrated in the embodiment of a pivot cab 250, provides surface area and walls on which to place controls and electronic components.

Figure 7:
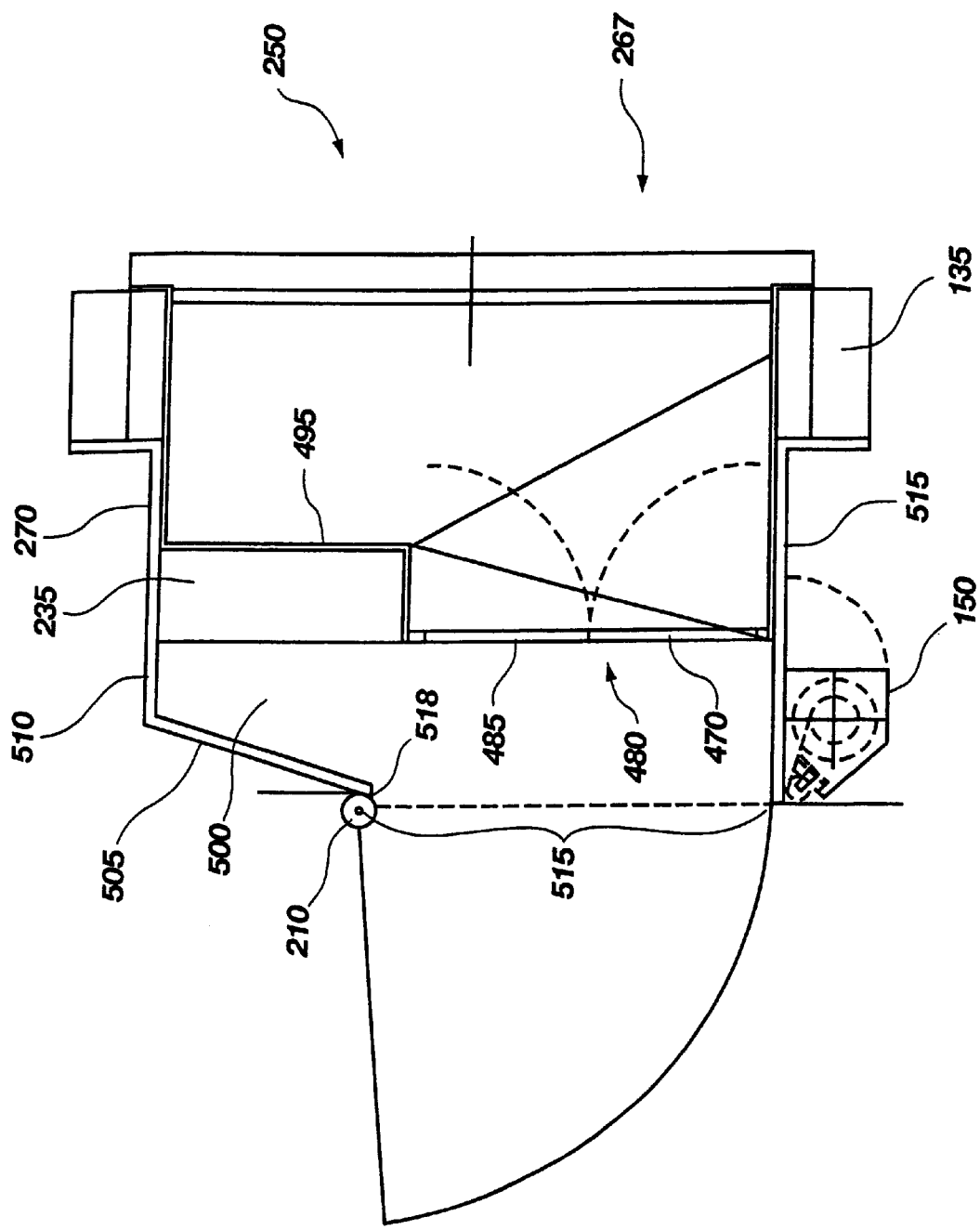
FIG. 7 is a plan view in partial cross-section of the embodiment of FIGS. 2 and 3.

As shown in FIG. 7, the distance 518 between a first side element or panel 505 and the vertical pivot axis 210 is dimensionally smaller than the distance 515 which is measured between the pivot axis 210 and the second side element 515. The side elements 505 and 515 may be viewed as forming a frame element which defines the entryway into the cab structure.

The present invention has been described in detail with reference to specific embodiments. The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for association with a passageway having a sidewall, comprising:
   a pivot structure associated with said sidewall of said passageway;
   a pivot cab having a first end in open communication with said passageway, and defining a volume bounded by enclosing structure comprising:
   a roof;
   a first panel;
   a floor; and
   an adjustable wall, said adjustable wall including an exposed portion and an unexposed portion;
   said exposed portion comprising enclosing structure defining said pivot cab volume;
   said unexposed portion being stored in a rolled-up configuration;
   said first panel being rotatably secured to said pivot structure for rotation about a vertical axis positioned proximate said sidewall, said adjustable wall being adapted to extend and retract in response to a rotation of said pivot cab; and
   a weather barrier disposed within said pivot cab, said weather barrier having a doorway and a dividing panel; said doorway having at least one door; and said dividing panel comprising at least one window
   an operator console cooperatively associated with said first panel to form an operator station positioned substantially to a side and out of the flow of traffic through said passageway;
   said pivot cab having a second end in open communication with interface structure constructed and arranged to engage an aircraft.

2. An apparatus in association with a passageway having first and second sides, said apparatus comprising:
   a pivot structure structured and arranged to provide an approximately vertical axis of rotation associated with one of said first and second sides of said passageway;
   a pivot cab having a first end in open communication with said passageway, and defining a volume bounded by enclosing structure having:
   a roof,
   a first panel rotatably secured to said pivot structure,
   a floor, and
   an adjustable wall said adjustable wall being adapted to extend and retract in response to a rotation of said pivot cab; and
   an operator console cooperatively associated with said first panel to form an operator station positioned substantially to a side and out of the flow of traffic through said passageway;
   wherein said pivot cab has a second end in open communication with interface structure constructed and arranged to engage an aircraft.

3. The apparatus according to claim 2, further comprising:
   a weather barrier comprising: a doorway and a dividing panel; said doorway having at least one door; and said dividing panel comprising at least one window.

4. The apparatus according to claim 3, said volume being bounded by enclosing structure further comprising a second panel.

5. The apparatus according to claim 4, wherein:
   said adjustable wall comprises a plurality of overlapping adjacent panel members having a common curvature and being disposed in sliding engagement for transverse motion relative each other;
   said transverse motion being in a wall extending or retracting direction.

6. The apparatus according to claim 4, wherein:
   said adjustable wall comprises an exposed portion and an unexposed portion;
   said exposed portion comprising enclosing structure defining said pivot cab volume; and
   said unexposed portion being stored in a rolled-up configuration.

7. The apparatus in association with a passageway according to claim 6, wherein:
   said pivot cab has an included pivot angle capability of approximately 135 degrees between a first and a second rotation orientation.

8. An apparatus for association with a passageway having two sides, comprising:
   a pivot structure being structured and arranged to provide an approximately vertical axis of rotation out of registration with a center of said passageway;
   a pivot cab being in open fluid communication on a first end with said passageway, and defining a volume bounded in part by:
   an enclosing roof, a first enclosing panel, an enclosing floor, and an adjustable wall, said adjustable wall having a plurality of overlapping adjacent panel members having a common curvature and being disposed in sliding engagement for transverse motion relative to each other;
   said transverse motion being in a wall extending or retracting direction;
   said first enclosing panel being rotatably secured to said pivot structure; and said pivot cab being in open fluid communication on a second end with structure to engage an aircraft.

9. The apparatus according to claim 8 wherein said adjustable wall comprises an exposed portion and an unexposed portion; said exposed portion comprising enclosing structure defining said pivot cab volume and said unexposed portion being stored in a rolled-up configuration.

10. An apparatus for association with a passageway having two sides, comprising:

a pivot structure being structured and arranged to provide an approximately vertical axis of rotation out of registration with a center of said passageway;

a pivot cab being in open fluid communication on a first end with said passageway, and defining a volume bounded in part by:

an enclosing roof, a first enclosing panel, an enclosing floor, and an adjustable wall, said adjustable wall comprising an exposed portion and an unexposed portion, said exposed portion comprising enclosing structure defining said pivot cab volume and said unexposed portion being stored in a rolled-up configuration;

wherein said first enclosing panel is rotatably secured to said pivot structure, said pivot cab is in open fluid communication on a second end with structure to engage an aircraft and said pivot cab has an included pivot angle capability of approximately 135 degrees between a first and a second rotation orientation.

11. An apparatus for association with a passageway having a sidewall, said apparatus comprising:

a pivot structure associated with said sidewall of said passageway;

a pivot cab having a first end in open communication with said passageway, and defining a volume bounded by enclosing structure comprising:

a roof;
a first panel;
a floor; and
an adjustable wall;
said first panel being rotatably secured to said pivot structure for rotation about a vertical axis positioned proximate said sidewall;

wherein said adjustable wall comprises a plurality of overlapping adjacent panel members having a common curvature and disposed in sliding engagement for transverse motion relative each other, said transverse motion being in a wall extending or retracting direction, said adjustable wall extending and retracting in response to rotation of said pivot cab;

wherein said pivot cab has a second end in open communication with interface structure constructed and arranged to engage an aircraft.

12. The apparatus according to claim 11, further comprising:

a weather barrier comprising:
a doorway and a dividing panel;
said doorway having at least one door; and
said dividing panel comprising at least one window.

13. The apparatus according to claim 12, further comprising:

an operator console forming an operator station being disposed substantially to a side of said passageway and out of the flow of traffic through said passageway.

* * * * *